June 2, 1931. M. G. TORSON 1,807,677
DISHWASHING MACHINE
Filed Jan. 30, 1929 3 Sheets-Sheet 1
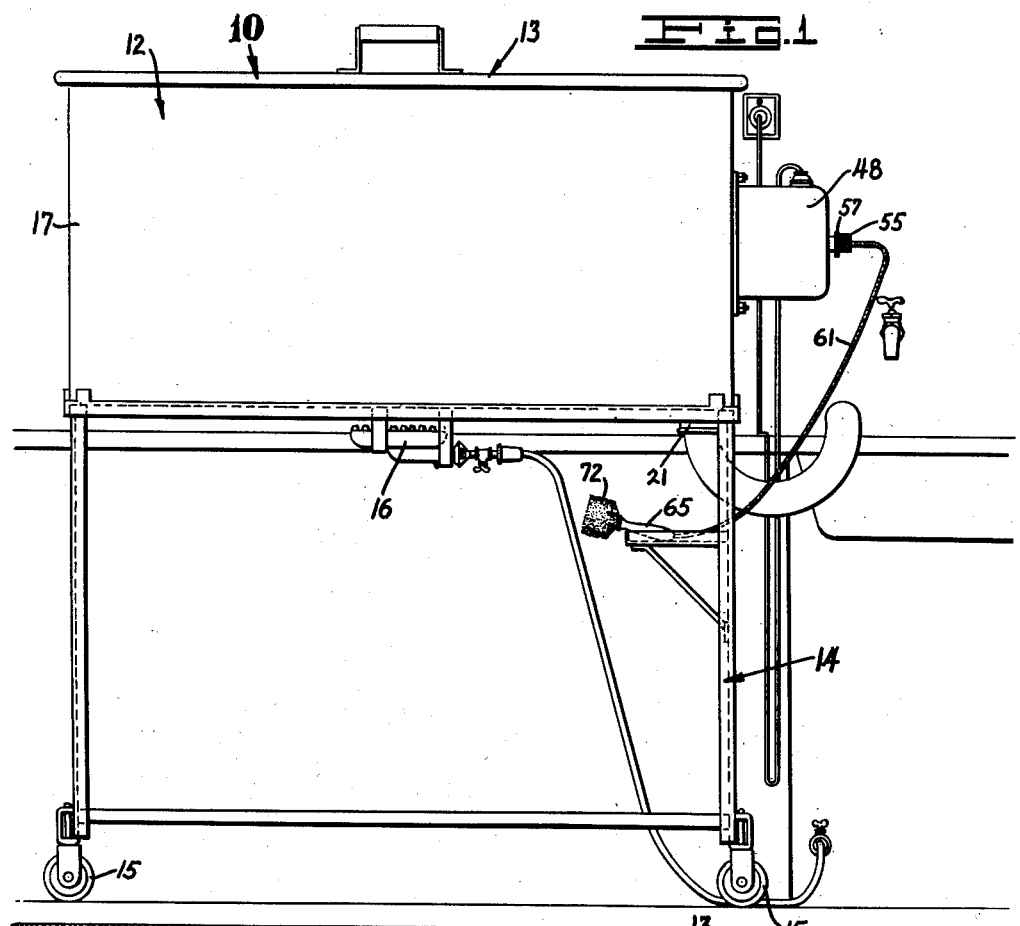
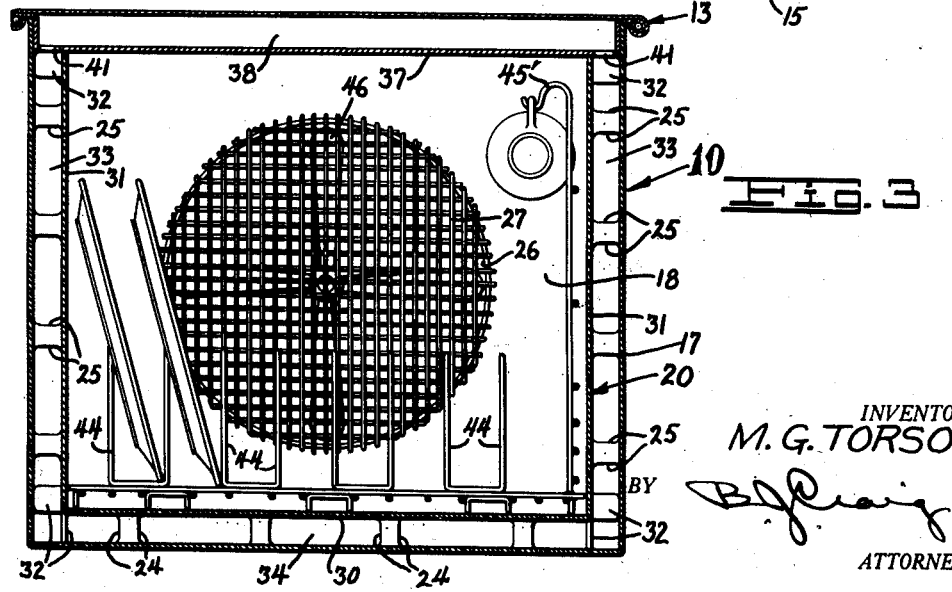
INVENTOR.
M. G. TORSON.
ATTORNEY.

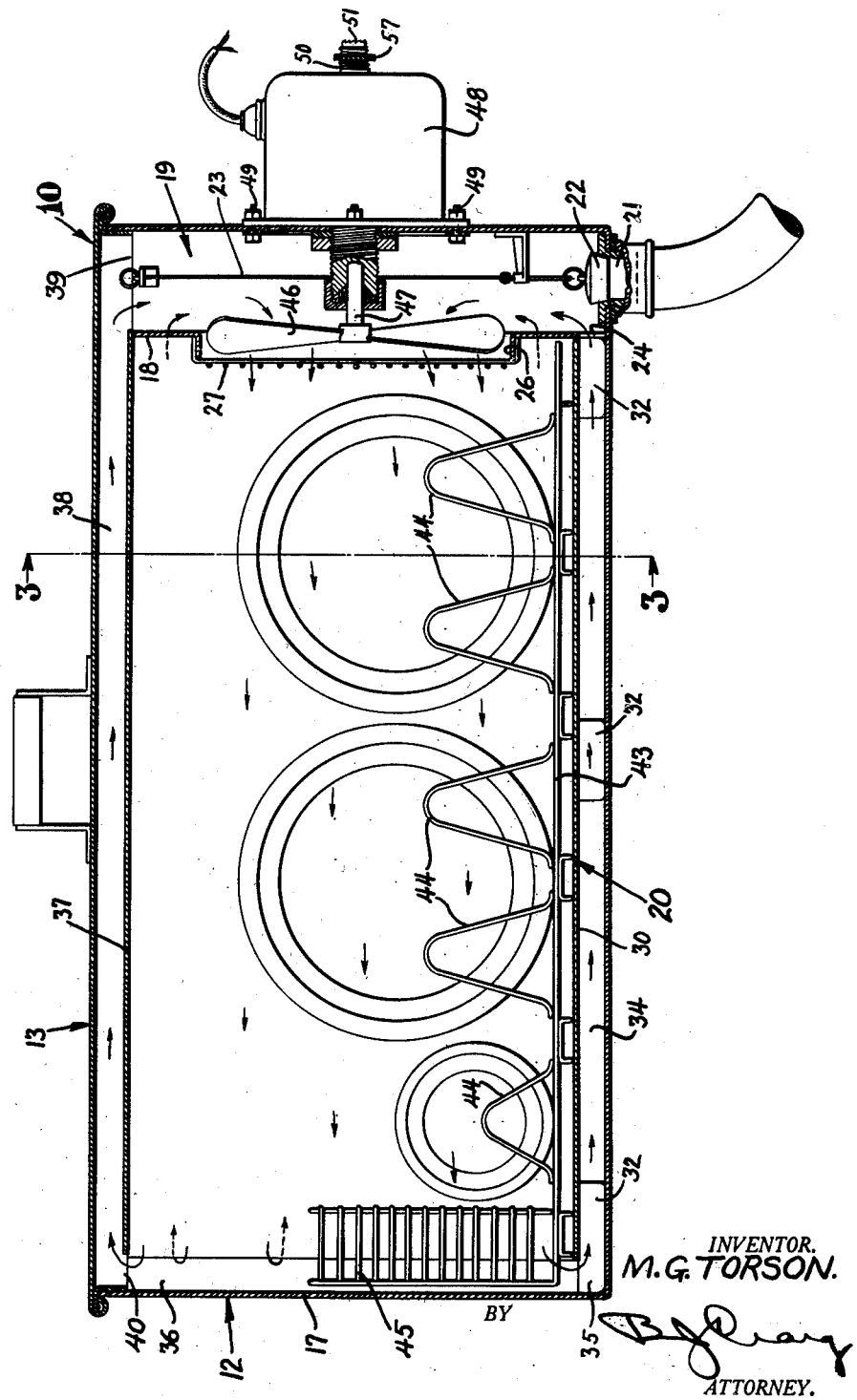

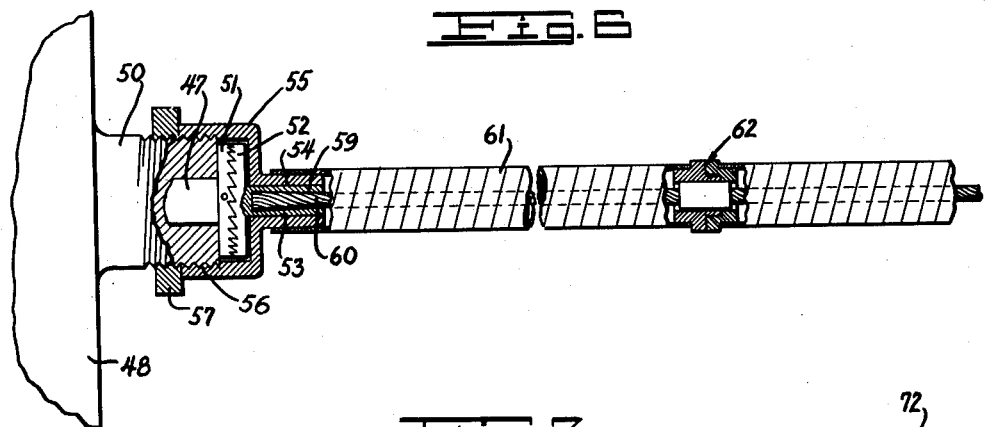
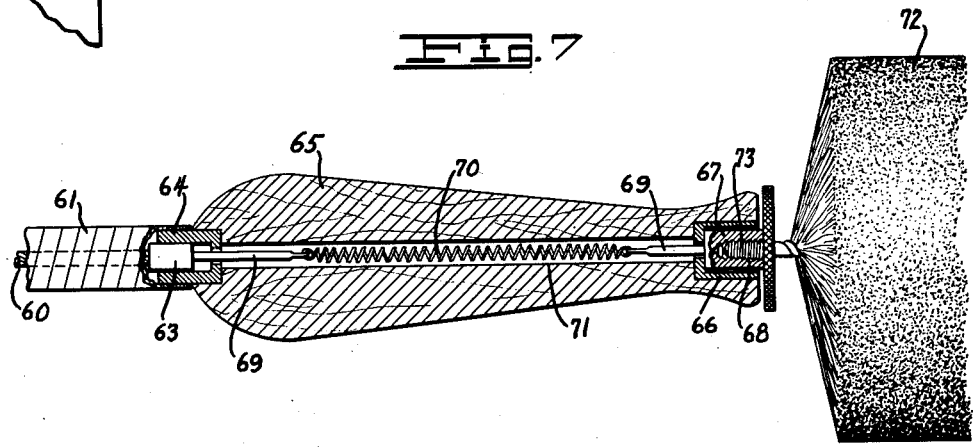
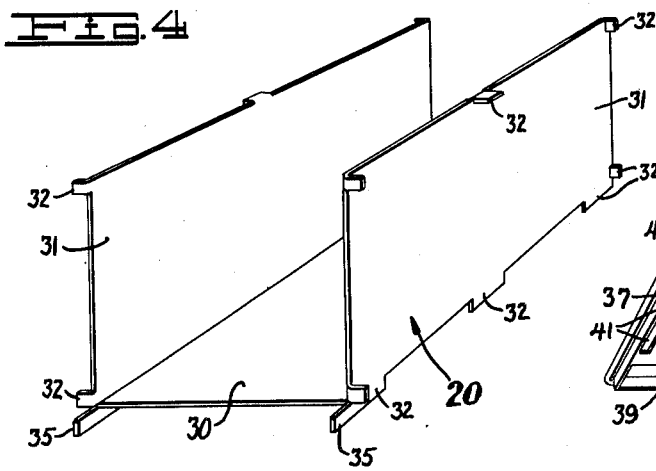
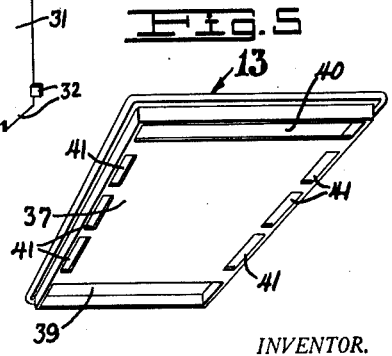

Patented June 2, 1931

1,807,677

UNITED STATES PATENT OFFICE

MARTIN G. TORSON, OF LONG BEACH, CALIFORNIA

DISHWASHING MACHINE

Application filed January 30, 1929. Serial No. 336,0..

This invention relates to improvements in dish washing machines.

The general object of the invention is to provide an improved dishwashing machine wherein the water is so directed as to secure a speedy and effective cleaning of the articles placed in the machine.

Another object of the invention is to provide an improved portable dishwashing machine for household use which is provided with means for heating the water used in the machine.

A further object of the invention is to provide a dishwashing machine having a driving means therein and wherein the driving means is provided with a power take-off for operating other devices.

Other objects and the advantages of my invention will be apparent from the following description taken in connection with the accompanying drawings wherein:

Fig. 1 is a side view of my improved dishwashing machine.

Fig. 2 is an enlarged central longitudinal section of the machine.

Fig. 3 is a section taken on line 3—3 of Fig. 2.

Fig. 4 is a perspective view of the inner channel member on a reduced scale.

Fig. 5 is a perspective view of the cover of the machine on a reduced scale.

Fig. 6 is an enlarged fragmentary view of one end of the auxiliary power take-off and Fig. 7 is a view similar to Fig. 6 showing the opposite end of the auxiliary power take-off.

Referring to the drawings by reference characters I have indicated my improved dishwashing machine generally at 10. As shown my machine comprises a suitable container 12 having a cover 13. The machine is shown as removably mounted on a carriage 14 which is preferably provided with swiveled rubber tired wheels 15. The carriage 14 is adapted to support a gas burner 16 or other heating element which is positioned just below the bottom of the container 12.

The container 12 includes an outer casing 17 provided with a partition 18 which forms a chamber 19, and having a removable channel member or receptacle 20 positioned therein. In the bottom wall of the casing in the chamber 19 I provide a drain aperture 21 which is adapted to be closed by a stopper 22 which is preferably provided with suitable means indicated at 23 for operating it from a point adjacent the top of the casing. The partition 18 includes a plurality of apertures 25 adjacent each side of the casing. The partition 18 further includes a central flanged aperture 26 over which a coarse meshed screen 27 is preferably positioned.

As clearly shown in Fig. 4 the channel member 20 includes a bottom wall 30 and side walls 31 and is open at each end and at the top. The member 20 is provided with a plurality of spacing members 32 which space the member 20 from the bottom and side walls of the casing 17, thereby forming channels 33 along each side of the container and a channel 34 along the bottom of the container when the member 20 is positioned in the casing. Some of the spacing members 32 at one end of the channel member protrude beyond the end of the member 20 as indicated at 35 and are adapted to maintain the end opposite the partition 18 spaced from the end wall of the casing to form a passageway 36.

The apertures 24 in the partition 18 communicate with the bottom channel 34 and the apertures 25 in the partition 18 communicate with the side channels 33 and the central aperture 26 in the partition communicates with the inside of the member 20. Thus it will be seen that a circuitous passageway is formed from the chamber 19 through the aperture 26 to the inside of the member 20 thence through the channels 33 and 34 and thence to the chamber 19 through the apertures 24 and 25.

As shown the cover 13 includes a body portion 37 which is hollow to provide a passageway 38 which is shown as the length and breadth of the casing. Adjacent one end of the cover I provide in the bottom wall thereof an aperture 39 and adjacent the opposite end I provide an aperture 40 and adjacent each side of the cover I provide a plurality of apertures 41. When the cover is correctly positioned on the casing the aperture 39 is positioned adjacent to the chamber 19 and the aperture 40 adjacent the opposite end of the casing.

Thus it will be seen that a passageway is formed from the chamber 19 through the central aperture 26 therein to the inside of the member 20, through the cover aperture 40 and side apertures 41 which communicate with the channels 33 and 34, through the cover channel 38, and thence through the aperture 39 back to the chamber 19.

Removably positioned in the member 20 I provide a wire tray 43 which includes a plurality of disk racks 44 which are adapted to support dishes which are placed on edge and are disposed with their faces towards the sides of the machine. The tray 43 also preferably includes a wire basket 45 in which knives, forks, spoons, etc., are adapted to be placed and a plurality of cup and glass supports 45'.

Positioned in the chamber 19 and partly in the aperture 26 I provide an impeller 46 secured to an armature shaft 47 of an electric motor 48 which is secured to the casing 17 as by bolts 49.

In the operation of my device the dishes or other articles to be cleansed are placed on the tray 43, the container filled with hot water, preferably to a point above the aperture 26, a soap or a soap powder put therein, the cover positioned thereon and the electric motor 48 started. Thereupon the impeller 46 forces the water from the chamber 19 through the aperture 26 into the member 20 thence back through the side channels 33, the bottom channel 34 and the apertures 24 and 25 to the chamber 19. Thus it will be seen that a closed circulating circuit is formed and that the dishes are arranged therein edgewise to the flow of the water.

The force of the water as it passes the articles therein thoroughly cleanses them and by arranging the dishes edgewise to the flow of water the water has practically the same force on the articles therein farthest from the impeller as it has on those nearest the impeller.

As the machine is operating the soap will form suds which will rise and pass into the cover channel 38 through the end aperture 40 and side apertures 41 thence it will pass through the channel 38 and out of the aperture 39 into the chamber 19, where it will be mixed with the water and forced out through the aperture 26 by the impeller.

The end of the motor 48 opposite the impeller 46 includes an externally screw threaded hub 50 beyond which the armature shaft 47 extends and has secured thereto a toothed clutch member 51 which is adapted to engage a similarly toothed clutch member 52. The member 52 includes a shaft 53 which is positioned in an aperture 54 of a member 55 which includes a screw threaded portion 56 which is adapted to engage the screw threads on the hub 50.

To engage the clutch members 51 and 52 the member 55 is screwed towards the motor 48 and to disengage the clutch members the member 55 is screwed in the opposite direction, said member 55 being adapted to be locked in position by a lock nut 57 which engages the screw threads of the hub 50.

The shaft 53 of the member 52 is provided with a recess 59 in which a flexible power transmission shaft or cable 60 is secured. Surrounding the cable 60 I preferably provide a flexible conduct 61 which is secured to the member 55 and includes a plurality of bearings as indicated at 62 which are adapted to support the cable 60.

The opposite end of the cable is shown as secured to a hub 63 which is positioned in a bearing 64 of a handle 65 and the opposite end of the flexible conduit is also secured to the bearing. Adjacent the opposite end of the handle 65 I provide another bearing 66 in which is positioned a hub 67 having a screw threaded recess 68 therein.

Each of the hubs 63 and 67 includes a shank 69 which are connected by a coiled spring 70 positioned in an aperture 71 in the handle 65. This coiled spring is adapted to maintain the cable 60 taut. A wire brush 72 which includes a screw threaded shank 73 is positioned in the threaded recess 68 of the hub 67 so that it may be driven by the flexible power transmission device and by this means the dishes and pans having hardened materials thereon in the washer may be scrubbed if desired.

From the foregoing description it will be apparent that I have provided a novel washing machine which will serve to thoroughly wash and cleanse dishes and all other household utensils and which is simple in construction and efficient in operation.

Having thus described my invention, I claim:

1. A dishwashing machine comprising a container, a plurality of partitions in said container arranged to form a central compartment providing passageways between the compartment and said container on the sides, ends and bottom thereof, said passageways and central compartment all being in communication with each other and means in one of said passageways to force water into said central compartment and to draw the water from the other passageways.

2. In a dishwashing machine, a container, a transverse partition in said container adjacent one end thereof to form an end chamber, said partition having an aperture therein, an impeller in said chamber adjacent said aperture, means to drive said impeller, a receptacle positioned in said container and spaced from the bottom of said container to form a bottom passageway and communicating at its ends with said container, said partition having an aperture adapted to register with said bottom passageway, and dish holding means positioned in said receptacle.

3. In a dishwashing machine, a container, a transverse partition in said container adjacent one end thereof to form an end chamber, said partition having a central aperture, an impeller in said chamber adjacent said central aperture, means to drive said impeller, a channel member positioned in said container, said member being spaced from the sides and ends of said container to form a passageway on each side, there being a plurality of apertures in said partition communicating with said side passageways and a tray removably positioned in said member.

4. In a dishwashing machine, a container, a transverse partition in said container adjacent one end thereof to form an end chamber, said partition having a central aperture, an impeller in said chamber adjacent said central aperture, means to operate said impeller, a receptacle removably positioned in said container, said receptacle including means to space it from said container to form a passageway on each side and a bottom passageway, said receptacle communicating at its ends with said container, there being a plurality of apertures in said partition adapted to register with said side and said bottom passageways, a cover for said container, said cover including a body portion having a passage way therein and having an aperture adjacent one end of said cover adapted to register with said chamber and afford communication between said chamber and said cover passageway, there being an aperture adjacent the opposite end of said cover in communication with said cover passageway and the end of said container remote from said partition, there being a plurality of apertures adjacent each side of said cover in register with said side passageways and said cover passageway.

5. In a dishwashing machine, a container, a drain spout for said container, a transverse partition in said container adjacent on end thereof to form an end chamber, said partition having a central aperture, an impeller in said chamber adjacent said central aperture, an electric motor positioned outside of and secured to said container, said motor including a shaft, one end of said shaft extending into said chamber and said impeller being secured to said shaft, a channel member removably positioned in said container, said member including means to space it from said container at the sides, bottom and end remote from said partition to form a passageway on each side, and a bottom passageway between said container and said channel member, there being a plurality of apertures in said partition adapted to register with said side and said bottom passageways, a cover for said container, said cover including a body portion having a passageway therein, there being an aperture adjacent one end of said cover adapted to register with said chamber and afford communication between said chamber and said cover passageway, there being an aperture adjacent the opposite end of said cover adapted to afford communication between the end of said container remote from said partition and said cover passageway, there being a plurality of apertures adjacent each side of said cover adapted to register with said side passageways to afford communication between said side passageways and said cover passageway, and a dish holding member in said channel member.

In testimony whereof, I hereunto affix my signature.

MARTIN G. TORSON.